March 26, 1940.  A. E. BRONSON  2,194,635
VALVE STEM
Filed Dec. 7, 1935

INVENTOR.
ADELBERT E. BRONSON
BY Kwis Hudson & Kent
ATTORNEYS

Patented Mar. 26, 1940

2,194,635

UNITED STATES PATENT OFFICE 2,194,635

VALVE STEM

Adelbert E. Bronson, Shaker Heights, Ohio, assignor to The Dill Manufacturing Company, Cleveland, Ohio, a corporation of Ohio Application December 7, 1935, Serial No. 53,383

9 Claims. (Cl. 152—429)

This invention relates to a valve stem particularly adapted for use with inflatable rubber or flexible articles, such as pneumatic tires, tire tubes, balls or other inflatable articles or devices.

An object of the invention is to provide a valve stem wherein the base of the stem is of improved and novel construction and of such character that it is relatively thin and can be permanently secured to a tire, inner tube or other rubber article and although conforming to the configuration of the tire tube or article will possess the desired and necessary strength.

Another object is to provide a valve stem which may be readily applied to any portion of a tire, inner tube or other rubber article and can be so secured thereto as to become in effect an integral part thereof.

A further object is to provide a valve stem which can be vulcanized or integrally united to a tire, inner tube or other rubber article and which is provided with a pliable base formed of cords, cord fabric or threads.

A still further object is to provide a valve stem which has the attributes of a rubber valve stem, but which is cheaper to manufacture and apply to a tire, tire tube or other rubber article than is a rubber valve stem.

Another object is to provide a valve stem which is simple in construction and which may be expeditiously and economically manufactured.

Further and additional objects and advantages not hereinbefore specified will become apparent hereinafter during the detailed description which is to follow of several embodiments of the invention.

Referring to the accompanying drawing.

It will be understood that although the valve stem construction embodying the invention is described herein with specific reference to its use upon the inner tube of a pneumatic tire, that such description is merely by way of illustration and is selected as an example because the valve stem construction has particular utility when used with an inner tube.

It will be appreciated and should be so understood that a valve stem construction embodying the present invention is susceptible also of advantageous use upon other inflatable rubber or flexible articles.

The present invention contemplates a valve stem construction which includes a base to which the stem proper is secured and which base is formed of suitable pliable material having sufficient strength to provide a strong reenforcement for the attachment of the valve stem to a tire tube or other article. In addition to providing an attachment of the stem to the tube or article, the base enables the stem construction to be vulcanized in any desired location to the tube or article so as to become an integral part thereof.

The invention further contemplates forming the base of the valve stem construction of pliable material, such as cords, or strings or of woven, knitted or crocheted cord fabric and the like.

Figure 1:
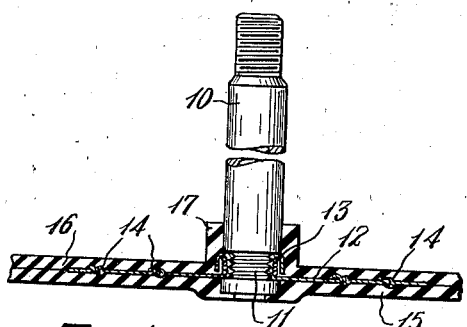
Fig. 1 is a view showing one form of the invention, the valve stem proper being shown in elevation while the valve stem base and portions of a tire tube are shown in section, the section being taken substantially on line 1—1 of Fig. 2 looking in the direction of the arrows.
Figure 2:
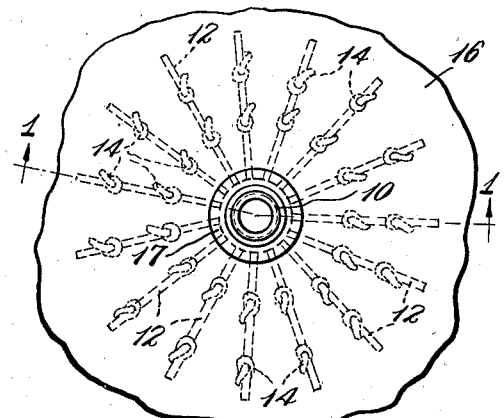
Fig. 2 is a top plan view of the valve stem shown in Fig. 1.

Referring to Figs. 1 and 2 the valve stem construction comprises a metal stem 10 adapted to receive the usual valve insides and provided adjacent its inner end with an annular recessed portion 11 which preferably is grooved or threaded.

The base of the valve stem is formed of a plurality of cords 12 which are connected to the stem by being bound into the recessed portion thereof by means of threads, wires or other suitable tying members 13, as clearly illustrated in Fig. 1. In order to effect a better bond or connection between the cords, the tire tube and the rubber patch, as will later be explained, the cords 12 are preferably provided with knots 14. The cords 12 may be separate cords or the base may be formed of the cord material usually employed in the manufacture of tire tubes and wherein the heavy cords which extend longitudinally of the tire are connected by fine threads which are adapted to break when the tire is flexed.

A valve stem construction employing the stem 10 and the base formed of the cords 12 connected to the stem is secured to a tire tube 15 by laying the base on any desired part of the crude rubber tube during the manufacture of the tube, after which a piece or patch of crude rubber stock 16 is placed over the base and when the tube is vulcanized or cured, the base with the attached stem, the patch and the tube become, in effect, an integral part of the tube with the base lying between the outer side of the tube and the under side of the patch, it being understood that after vulcanization the patch and tube become substantially a single piece of rubber.

After the valve stem construction and the patch have been placed on the tire tube and the latter enclosed in the mold, the tube can then be pierced and inflated by suitable means as, for example, by applying through the valve stem bore a hollow electric needle which will pierce the tube and will permit through the needle inflation of the tube for vulcanization.

The patch 16 may be pressed or formed prior to its application to the tube so as to have any desired configuration, and it will be noted in Fig. 1, said patch is shown as provided with a centrally located outwardly projecting enlarged portion 17 surrounding the stem 10, which portion when the tube is in use will act to center the stem in the rim opening.

Figure 3:
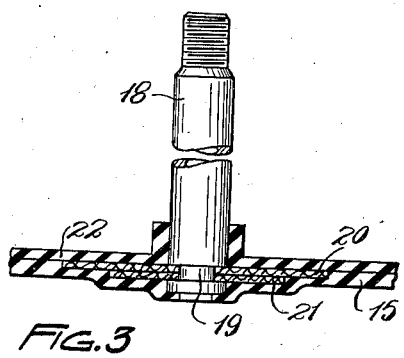
Fig. 3 is a view similar to Fig. 1, but discloses another embodiment of the invention, and is taken substantially on line 3—3 of Fig. 4 looking in the direction of the arrows.
Figure 4:
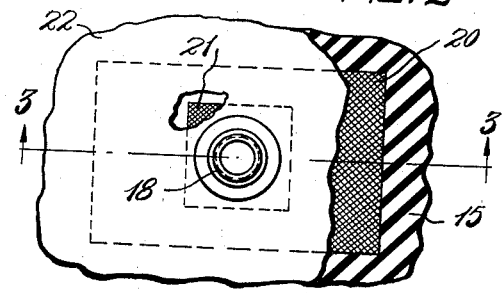
Fig. 4 is a top plan view of the valve stem shown in Fig. 3.

Another form of the invention is illustrated in Figs. 3 and 4 and the valve stem construction shown therein comprises a metal stem 18 similar to the stem 10 and provided adjacent its inner end with an annular recessed portion 19. The base of the stem comprises a piece of cord fabric 20 and a smaller piece of cord fabric 21 which, as clearly shown in Fig. 3, engage in the recessed portion 19 of the stem. The two pieces of cord fabric 20 and 21 may be applied to the stem in any suitable manner, although at the present time it is believed the most expeditious way of applying the pieces of fabric to the stem is to separate the cords of the fabric approximately at the central point of the two pieces and pass the stem through the openings formed in the pieces by the separation of the cords until the pieces of fabric contact the stem in the recessed portion 19.

The stem 18 and the base formed of the two pieces of cord fabric 20 and 21 are positioned upon the tire tube 15 in any desired location, and then the rubber patch 22 which is formed of crude rubber and may have been previously pressed up into the shape desired is positioned upon the stem and over the base and the crude rubber tube which is in the mold preparatory to vulcanization. The mold is then closed and the tube pierced by the hollow electric needle inserted through the valve stem, after which the tube is inflated and the patch and base are vulcanized thereto during the curing of the tube and become an integral part of the tube.

Figure 5:
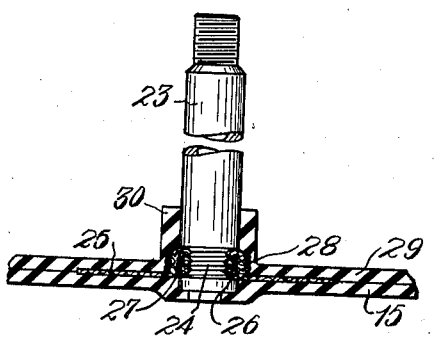
Fig. 5 is a view similar to Figs. 1 and 3 but illustrates a still different form of the invention.
Figure 6:
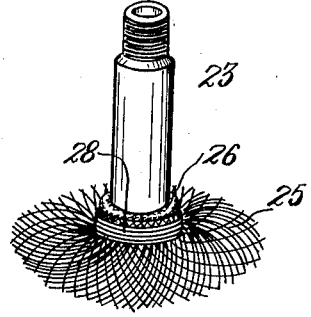
Fig. 6 is an elevational view of the valve stem construction shown in Fig. 5 before the same is applied to a tire tube or other rubber article.

In Figs. 5 and 6 a still different form of the invention is illustrated from those previously described. In this form the valve stem 23 may be identical with the valve stem 10 and has a recessed portion 24 adjacent its inner end, which portion is preferably grooved or threaded. The base may be formed of cord fabric tubing, crocheted pieces of tubing or other similar means. As illustrated in Figs. 5 and 6, the base has a substantially flat circular portion 25 and a centrally arranged tubular portion 26.

In securing the base to the stem 23 the base is first mounted upon the stem in an inverted position, with the outer end of the tubular portion 26 surrounding the recessed portion 24 of the stem. The outer end of the tubular portion is then bound into the recessed portion of the stem by means of threads, wires or other suitable binding members 27 and then the tubular portion is folded down over its bound end until it takes the position shown in Fig. 5, after which a folded down part of the tubular portion is bound against the previously bound end portion by means of suitable threads, wires or other binding members 28.

The valve stem construction shown in Figs. 5 and 6 is secured to the crude or uncured tire tube in any suitable position by placing the flat portion 25 of the base upon the outer surface of the tube and then positioning a suitable crude rubber patch 29 over the base with its central portion 30 surrounding the valve stem and the tubular portion 26 of the base. The tire tube, base and patch are then vulcanized simultaneously with the vulcanization of the tire tube so as to become an integral structure in the same manner as has been previously described with reference to the other forms.

Figure 7:
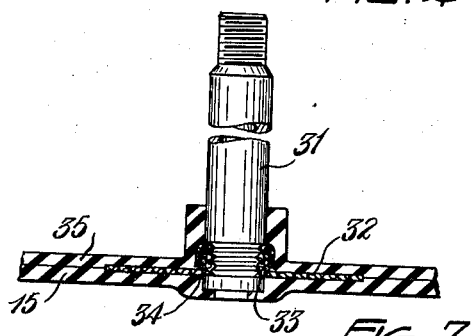
Fig. 7 is a view similar to Figs. 1, 3 and 5, but illustrates a still different form of the invention from those shown in said figures.

In Fig. 7 the valve stem construction comprises a stem 31 identical with the stem 23 and a base similar to the base described in connection with Figs. 5 and 6 and comprising a flat portion 32 and a tubular portion 33. The tubular portion of the base is positioned upon the valve stem with the part of said portion adjacent the portion 32 located in the recessed portion at the inner end of the valve stem and bound therein by suitable threads, wires or other binding members 34, while the upper part of the tubular portion 33 is turned down over the binding wires or threads 34.

In securing this form of the valve stem construction to the tire tube 15 a crude rubber patch 35, which may be identical with the patch 29 previously described, is positioned over the base and tube and then during the vulcanization of the tube the patch, base and tube are vulcanized together to become an integral structure.

Figure 8:
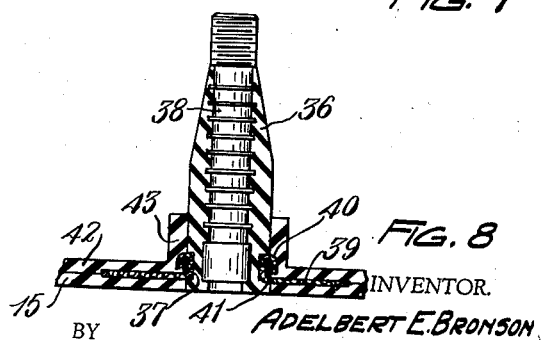
Fig. 8 is a view similar to Figs. 1, 3, 5 and 7, but illustrates a further modification of the invention from those previously illustrated.

In Fig. 8 in place of the metal valve stem previously described, a rubber stem 36 is shown, said stem having on its periphery adjacent its inner end an annular recess 37. As is common with rubber valve stems, the stem is provided with a metal insert 38.

The base of the stem is similar to the bases shown in Figs. 5 to 7 inclusive, and comprises a flat portion 39 and a tubular portion 40, the latter being bound into the annular recess 37 by means of threads, wires or other binding members 41 in the same way as was the tubular portion 33 of the base shown in Fig. 7.

The valve stem construction shown in Fig. 8 may be formed in the following manner: The stem 36 is pressed or formed from crude rubber stock as is the patch 42. The metal insert 38 is positioned in the uncured stem 36 and the base is then secured to the inner end of the stem, after which the patch is positioned upon the stem with its enlarged central portion 43 surrounding the stem and the bound tubular portion of the base. The stem with the insert therein, the base and the patch are then positioned upon the uncured tire tube and simultaneously with the vulcanization of the tube are vulcanized to the latter and to each other and becomes an integral part thereof.

it being understood that the valve stem 36 and the base 42 are cured or vulcanized simultaneously with the vulcanization of the tube.

From the foregoing description of several embodiments of the invention it will be seen that a valve stem constructed in accordance therewith is very economical to manufacture and can be expeditiously secured to the tire tube. The stems and bases can be manufactured and secured together in quantity lots and then applied to the tubes during the manufacture and curing of the latter. The manner in which the stems and bases are secured to the tubes insures an air-tight connection between the stems and tubes and one which will possess the requisite strength, while the bases although pliable are formed of such material as to adequately reenforce the connection between the stems and the tubes. In addition, the stems can be mounted on bases of uniform character and then patches to suit various conditions can be employed during the manufacture of the tubes.

Valve stems of the character illustrated and described herein, because of their pliable bases, will adapt themselves to the configuration of the tire tubes and can be secured thereto at any desired location.

Although the invention has been specifically illustrated as applied to a tire tube, it should be understood, as previously mentioned, that it may equally as well be applied to various other inflatable rubber or flexible articles.

It will further be understood that the cords or fabric can be impregnated with latex either before weaving or after they have been connected to the stem and prior to being secured to the tube.

Although several preferred embodiments of the invention have been illustrated and described herein, it should be understood that the invention is susceptible of various modifications and adaptations within the scope of the appended claims.

Having thus described my invention I claim:

1. In combination, a rubber article and a valve stem, said valve stem comprising a pliable base formed of cords arranged in direct contact with a portion of the exterior of said article, and a separate stem portion provided with an annular recess adjacent its lower end and in which is located and secured the central portion of said base, and a rubber patch on the exterior of the article arranged to extend over and beyond said base, said article, base and patch being molded or vulcanized together.

2. A valve stem construction comprising a stem proper, a pliable base formed of a plurality of separate cords provided intermediate their ends with knots, and means for binding the inner ends of said cords to said stem.

3. As an article of manufacture, a valve stem construction comprising a stem proper having adjacent its inner end an annular recess, a pliable base formed of a plurality of separate cords, and means for binding the inner ends of said cords to said stem in said annular recess.

4. As an article of manufacture, a valve stem construction comprising a stem proper having adjacent its inner end an annular recess, a pliable base formed solely of cords, and means for binding a portion of said base to said stem in said annular recess.

5. In combination, a rubber article and a valve stem, said valve stem comprising a pliable base formed of cords and arranged in direct contact with a portion of the exterior of the article, a separate stem proper, means binding the cords to the lower end only of the stem proper, and a rubber patch on the exterior of the article arranged to extend over and beyond said base; said patch, base, and article being molded or vulcanized together.

6. In combination, a rubber article and a valve stem, said valve stem comprising a stem proper, a separate pliable base arranged in direct contact with a portion of the exterior of the article and formed of cord fabric having a tubular portion, means binding said tubular portion to the lower end only of the stem proper, and a rubber patch on the exterior of the article arranged to extend over and beyond said base; said patch, base, and article being molded or vulcanized together.

7. In combination, a rubber article and a valve stem, said valve stem comprising a stem proper having adjacent one end an annular recess, a separate pliable base arranged in direct contact with a portion of the exterior of the article and formed of cord fabric having a tubular portion surrounding said recess of the stem proper, means binding said portion in said recess, and a rubber patch on the exterior of the article arranged to extend over and beyond said base; said patch, base, and article being molded or vulcanized together.

8. In combination, a rubber article and a valve stem, said valve stem comprising a rubber stem, a separate pliable base arranged in direct contact with a portion of the exterior of the article and formed of cords, means connecting the cords to the lower end only of the rubber stem, and a rubber patch on the exterior of the article arranged to extend over and beyond said base; said patch, rubber stem, and article being molded or vulcanized together.

9. In combination, a rubber article and a valve stem, said valve stem comprising a rubber stem having an annular recess adjacent one end, a separate pliable base arranged in direct contact with a portion of the exterior of the article and formed of cords, means binding the cords to the rubber stem in said recess, and a rubber patch on the exterior of the article arranged to extend over and beyond said base; said patch, rubber stem, and article being molded or vulcanized together.

ADELBERT E. BRONSON.